Sept. 1, 1953 W. McKOWEN Re. 23,708

LOOSE-LEAF BINDER

Original Filed Aug. 14, 1950

Inventor
William McKowen by: Bair Freeman & Molinare
Attys.

Reissued Sept. 1, 1953 Re. 23,708

UNITED STATES PATENT OFFICE 23,708

LOOSE-LEAF BINDER

William McKowen, Des Moines, Iowa

Original No. 2,607,350, dated August 19, 1952, Serial No. 179,177, August 14, 1950. Application for reissue June 9, 1953, Serial No. 360,626

5 Claims. (Cl. 129—1)

Matter enclosed in heavy brackets [ ] appears in the original patent but forms no part of this reissue specification; matter printed in italics indicates the additions made by reissue.

The present invention relates to improvements in loose leaf binders of the ring type, adapted for accommodating therein a quantity of apertured filler sheets.

It has long been known that binders of the type above referred to have always presented the problem of jamming, catching, binding, tearing and damage to the filler sheets as a result of the binder being moved from an open to a closed position. Binders of this general type include a series of spaced apart rings which are substantially circular information, with the exception of the portion secured to a backing plate. Due to the contour of such rings, the matter of movement of the filler sheets in the process of closing the binder is subjected to two main actions. The top cover element or back cover element, in the process of being moved from an open to a closed position, results in lifting the filler sheets which are resting upon such element, and moving the outer portions thereof in an upward direction toward the other cover element, while at the same time the inner marginal edges of those filler sheets, by reason of their location generally on the lower half portion of the rings, at a position closely adjacent the back plate assembly that supports the rings, tend to move downwardly on such lower portions of the rings. Such movement in the opposite direction results in the edges of the apertures of the filler sheets catching or binding on the rings, and sometimes cause damage or tearing of the sheets adjacent the apertures. Furthermore, such binding action is frequently transmitted to the back or cover elements of the binder and causes damage thereto.

There have been numerous attempts to provide a solution to this problem, practically all of which are either impractical structurally or are impractical as a result of the extremely high added cost in production. The only commercially available binder known, which embodies a construction directed to the solution of this problem is one employing what is sometimes referred to as booster sheet or lifter, formed of relatively heavy, rigid stock, and which in turn is connected by hinge elements to the backing plate. Such a construction, in addition to being relatively expensive to embody in a ring binder, also is bulky and awkward and presents a somewhat unsightly appearance.

One of the objects of this invention is to provide in a loose leaf binder of the character indicated, an extremely simple and effective construction which insures against jamming, binding, tearing or damage to the filler sheets, and which eliminates stress and strain in the cover or back elements of the binder incident to closing of the binder.

Another object is to provide an improved loose leaf binder of the character indicated, characterized by the provision of a filler block, in the nature of an abutment, to provide support for the inner marginal edges of the filler sheets, and which, incident to closing of the binder, positively and gently forces the filler sheets to travel upwardly toward the free, top portion of the rings.

A further object is to provide an improved loose leaf binder of the character indicated, which permits the use of extremely light weight filler stock, and which insures against tearing or damage to the filler stock and eliminates all binding action incident to closing of the binder.

Still another object is to provide a novel loose leaf binder construction of the character indicated, which possesses the foregoing advantages and which is capable of being produced at extremely low cost.

Other objects and advantages of this invention will be apparent from the following description, taken in connection with the accompanying drawing in which.

Figure 1:
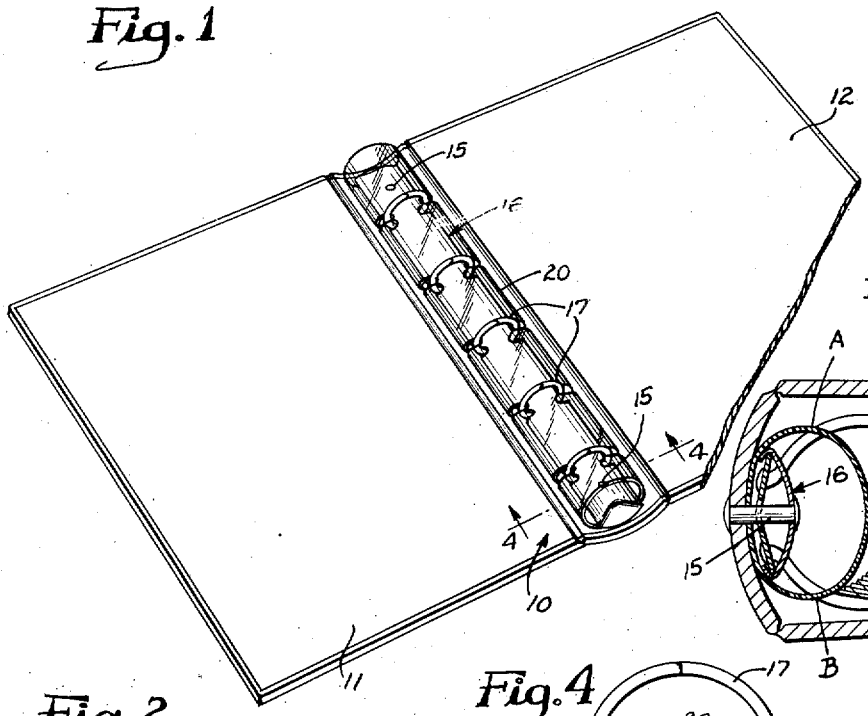
Figure 1 is a perspective view, in open position, of a ring type loose leaf binder embodying the present invention.
Figure 6:
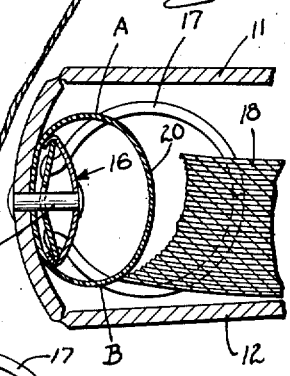
Figure 6 is a fragmentary sectional view, taken at the same plane as Figure 4, showing the binder in closed position.

In the drawings, I have shown a more or less conventional type of ring binder to which the present invention is applied. The binder includes a conventional back indicated generally at 10, including front cover 11 and back cover 12 interconnected hingedly, in a conventional manner, with a central back member 14. Secured centrally of the central back member 14, as by rivets 15, is a conventional metallic back plate assembly, provided with a plurality of longitudinally spaced apart, split ring retainers 17 of conventional form. Said rings are connected to the back or shield plate assembly 16 in a usual manner so as to permit separation and closing of the two halves of the rings for insertion or removal of a quantity of filler sheet stock, as indicated at 18.

Figure 2:
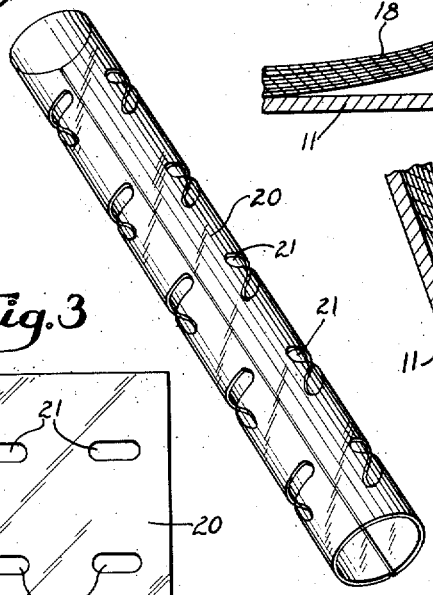
Figure 2 is a perspective view of the filler block element embodying one form of the present invention.
Figure 4:
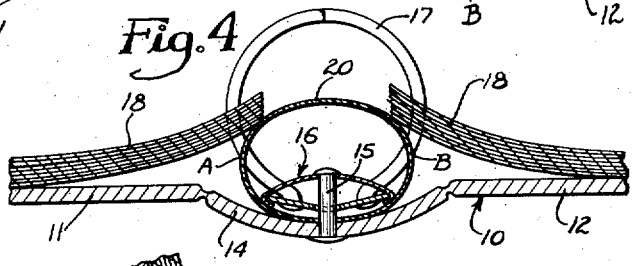
Figure 4 is an enlarged, fragmentary, transverse, sectional view through the binder, taken substantially as indicated at line 4—4 on Figure 1, showing a quantity of filler sheets supported on the cover elements of the back, and with their inner edges supported in proper position on the filler block.
Figure 3:
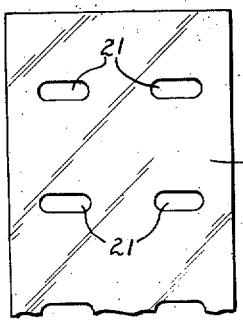
Figure 3 is a fragmentary plan view of a flat, rectangular sheet of stock from which the filler block element is formed.
Figure 5:
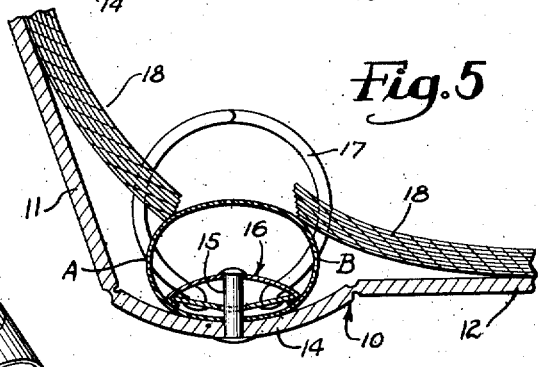
Figure 5 is a sectional view, similar to Figure 4, showing the binder with the filler sheets therein, in process of closing of the binder.

The present invention is directed to the provision of means for supporting the inner marginal edges of the filler sheets so as to insure against movement of the filler sheets toward the lower portion of the retaining rings 17, incident to closing of the binder. As shown herein, said means is in the form of a tubular or cylindrical element, designated at 20, and which for convenience will be referred to as a filler block. The filler block as represented in the drawing is formed from a flat, rectangular sheet of material, as seen in Figure 3, which may be either paper, metal, plastic, or suitable material, and is preferably of a length substantially equal to the length of the filler sheets 18. The filler block sheet is formed at its two opposite longitudinal edges with a series of aligned, elongated apertures 21. The sheet is then rolled to form a split tube, of substantially cylindrical cross section, as seen in Figure 2 of the drawing. The formed filler block member is then placed in the binder, prior to the introduction of filler stock, with the apertures 21 fitted over the respective sections of the split retaining ring 17, with the longitudinal edges of the tubular filler block inserted beneath the back plate assembly, as seen in Figures 4 and 5 of the drawing, so that said edges thereof substantially abut against the rivets 15. Due to the dimensions and/or form of the back or shield plate assembly, said tubular filler block is caused to assume an oval shaped contour in cross section, as seen in Figures 4 and 5 of the drawing.

In order to insure obtaining proper cross sectional formation of the filler block in operative position, it is to be understood that the elongated apertures 21 of the filler block are of such size and are so located that when the filler block is in position in the binder, the edges of the apertures are free from contact with the retaining rings of the binder.

The filler block preferably is so dimensioned that when mounted in position in the binder, it effectively blocks off at least the lower third of the normal circumferential extent of the retaining rings, since such rings are generally formed substantially circular in contour, with the exception of the portion for attachment to the back plate assembly. It is to be understood that the portion blocked off by the filler block, as indicated between the points represented at A and B, in Figures 4 and 5 of the drawing, is at least 120° arcuate extent, as measured about the axis defining the curvature of the ring. Thus, the upper remaining usable portion of the ring should be no greater than 240° arcuate extent.

It has been found, as a result of extensive research, that by blocking off at least the lower third portion of the retaining rings, as defined by the area between the points designated at A and B, it will at all times insure free movement of the filler sheets incident to closing of the binder, without possibility of jamming, binding, tearing, or damaging of the filler sheets and insures elimination of possible binding action which usually results in damaging or deformation of the back 10 of the binder.

As may be seen in Figures 4 and 5, the dimensional relationship of the filler block of oval cross section, is such that the arcuate end portions, located on the major axis of the oval, project laterally a substantial distance beyond the marginal edges of the back plate assembly. It will be further noted that the upper arcuate portion of the filler block extends a substantial distance upwardly within the retaining rings, and passes through a plane adjacent the axis of the rings. By virtue of this arrangement, the binder, when in open position, causes the inner marginal edges of the filler sheets to be properly supported on the upwardly curved top surface of the filler block. Thus, as the cover elements are moved one toward another, in process of closing the binder, the filler sheets are imparted a total bodily movement in the general direction of the upper portion of the rings 17, and which eliminates any possibility of the inner marginal edges of the filler sheets moving downwardly toward the lower third portion of the ring. As above pointed out, if the filler sheets move into the lower one-third portion of the rings, it would normally result in a cramping and binding action, frequently resulting in tearing and damaging of the filler sheets and possible deformation or damage to the back of the binder.

By virtue of the present invention, it is now, for the first time, possible to employ extremely light weight filler and stock in a loose leaf binder of the ring type, without the possibility of tearing or damaging the same in normal use of the binder.

While not absolutely necessary, I prefer that the filler block be formed of sheet material possessing resilient characteristics so as to permit a limited amount of flexing of the body of the filler block by pressure which may be exerted by the inner marginal edges of the filler sheets in the process of closing the binder. I have found that relatively thin sheets of acetate are highly satisfactory for the purpose, particularly in that it is possible to conveniently roll or form such sheet stock, and, by subjection to heat, impart thereto the desired contour, in substantially cylindrical form, which form it tends to retain indefinitely in the normal use in a loose leaf binder.

When the term "cylindrical form" is used herein and in the claims, the broadest possible meaning is intended, and it is intended to include all pertinent meanings set forth in Webster's unabridged dictionary under the term "cylinder," including: "The surface traced by any straight line, called generatrix or element, moving parallel to a fixed straight line." In the instance herein, the fixed straight line is the longitudinal axis of the filler block. In examining Figure 5, it will be evident that the filler sheets do not engage a portion of the filler block located between the points of intersection of the filler block and the projection of the ring circles. Therefore, that portion of the filler block member need not be of the particular shape as shown, but should be "cylindrical" within the meaning of the term expressed above. It is, of course, intended that the filler block will always have bilateral symmetry about the vertical plane through its longitudinal axis as seen in Figures 4 and 5.

Although I have herein disclosed means, for blocking off and precluding movement of the filler sheets into the lower third portion of the retaining rings, in the form of a tubular element, referred to as a filler block, it will be manifest that the filler block could be a solid body of material. It is also manifest that various other constructions may be satisfactorily employed for carrying out the present invention. For example, separate clip members may be made of metal, plastic, paper, or other material, shaped or molded to a desired contour, and inserted between adjacent rings of the binder, and affixed to or inserted beneath the metal back plate assembly. As an alternative arrangement, a suitable member may be formed of proper contour and positioned essentially within the rings and affixed to or inserted beneath the back plate assembly so as to provide a proper supporting surface for the inner marginal edges of the filler sheets in a manner similar to that herein disclosed.

Although I have herein shown and described a preferred embodiment of my invention, manifestly it is capable of modification and rearrangement of elements or components without departing from the spirit and scope thereof. I do not, therefore, wish to be understood as limiting this invention to the precise embodiment as herein disclosed, except as I may be so limited by the appended claims.

I claim as my invention:

1. A loose leaf binder comprising a pair of cover members hinged to a back member and adapted to be swung to open and closed positions, a plurality of spaced apart substantially circular retaining rings adapted to receive filler sheets provided with apertures at their inner marginal edges for fitting over said rings, said retaining rings being split and portions thereof being swingable toward and away from each other to close or open the rings, a shield plate mounted on and spaced away from said back member to provide a substantially enclosed chamber for positioning therein a ring operating mechanism for supporting said rings and for opening and closing the rings, said shield plate having apertures through which the rings extend with more than two-thirds of the arc of the circle of each ring exposed, a filler block member, separate and apart from said shield plate, of elongated cylindrical form, said filler block member having [its longitudinal edges] *portions thereof* positioned between said shield plate and said back member and extending from adjacent said shield plate to intersect the axial projection of said rings at two points so as to block off at least one-third of the arc of the ring circles with said shield plate positioned symmetrically within said blocked-off one-third, and said filler block member having series of apertures each of a dimension, in a direction normal to the length of the filler block member, much greater than the thickness of a ring, for fitting over said rings and accommodating opening and closing movement of said rings.

2. A loose leaf binder comprising a pair of cover members hinged to a back member and adapted to be swung to open and closed positions, a plurality of spaced apart substantially circular retaining rings adapted to receive filler sheets provided with apertures at their inner marginal edges for fitting over said rings, said retaining rings being split and portions thereof being swingable toward and away from each other to close or open the rings, a shield plate mounted on and spaced away from said back member to provide a substantially enclosed chamber for positioning therein a ring operating mechanism for supporting said rings and for opening and closing the rings, said shield plate having apertures through which the rings extend with more than two-thirds of the arc of the circle of each ring exposed, a filler block member, separate and apart from said shield plate, of elongated cylindrical form, said filler block member having [its longitudinal edges] *portions thereof* positioned between said shield plate and said back member and extending from adjacent said shield plate to intersect the axial projection of said rings at two points so as to block off at least one-third of the arc of the circle of each ring circles with said shield plate positioned symmetrically within said blocked-off one-third, said filler block member having series of apertures each of a dimension, in a direction normal to the length of a filler block member, much greater than the thickness of a ring, for fitting over said rings and accommodating opening and closing movement of said rings, and the maximum dimension of said filler block member transverse to its length being less than the diameter of said retaining rings, whereby there is no interference between the filler block member and said cover members when the cover members are in closed position.

3. A loose leaf binder comprising a pair of cover members hinged to a back member and adapted to be swung to open and closed positions, a plurality of spaced apart substantially circular retaining rings adapted to receive filler sheets provided with apertures at their inner marginal edges for fitting over said rings, said retaining rings being split and portions thereof being swingable toward and away from each other to close or open the rings, a shield plate mounted on and spaced away from said back member to provide a substantially enclosed chamber for positioning therein a ring operating mechanism for supporting said rings and for opening and closing the rings, said shield plate having apertures through which the rings extend with more than two-thirds of the arc of the circle of each ring exposed, a filler block member, separate and apart from said shield plate, of elongated cylindrical form, said filler block member having its longitudinal edges positioned between said shield plate and said back member and extending from adjacent said shield plate to intersect the axial projection of said rings at two points so as to block off at least one-third of the arc of the ring circles with said shield plate positioned symmetrically within said blocked-off one-third, said filler block member having series of apertures each of a dimension, in a direction normal to the length of the filler block member, much greater than the thickness of a ring, for fitting over said rings and accommodating opening and closing movement of said rings, said filler block member being formed of thin resilient material, and said longitudinal edges of the filler block member being resiliently biased toward each other.

4. In a loose leaf binder of the class wherein a pair of cover members are hinged to a back member having mounted thereon a plurality of spaced apart substantially circular retaining rings and a shield plate spaced from said back member and having apertures through which said rings extend with more than two-thirds of the arc of the circle of each ring exposed, the combination with said loose leaf binder of a filler block member, separate and apart from said shield plate, of elongated cylindrical form having [its longitudinal edges] *portions thereof* adapted to be positioned between said shield plate and said back member and adapted to extend from adjacent said shield plate to intersect the axial projection of said rings at two points so as to block off at least one-third of the arc of the ring circles with said shield plate positioned symmetrically within said blocked-off one-third, said filler block member having series of apertures each of a dimension, in a direction normal to the length of the filler block member, much greater than the thickness of a ring, adapted for fitting over said rings and accommodating opening and closing movement of said rings.

5. In a loose leaf binder of the class wherein a pair of cover members are hinged to a back member having mounted thereon a plurality of spaced apart substantially circular retaining rings and a shield plate spaced from said back member and having apertures through which said rings extend with more than two-thirds of the arc of the circle of each ring exposed, the combination with said loose leaf binder of a filler block member, separate and apart from said shield plate, of elongated cylindrical form having its longitudinal edges adapted to be positioned between said shield plate and said back member and adapted to extend from adjacent said shield plate to intersect the axial projection of said rings at two points so as to block off at least one-third of the arc of the ring circles with said shield plate positioned symmetrically within said blocked-off one-third, said filler block member having series of apertures each of a dimension, in a direction normal to the length of the filler block member, much greater than the thickness of a ring, adapted for fitting over said rings and accommodating opening and closing movement of said rings, said filler block member being formed of thin resilient material, and said longitudinal edges of the filler block member being resiliently biased toward each other.

WILLIAM McKOWEN.

References Cited in the file of this patent or the original patent

UNITED STATES PATENTS

| Number | Name | Date |
|---|---|---|
| 1,290,907 | Cardy | Jan. 14, 1919 |
| 1,438,061 | Selianoff | Dec. 5, 1922 |
| 1,985,364 | Dawson | Dec. 25, 1934 |
| 2,266,472 | Osborn | Dec. 16, 1941 |
| 2,324,460 | Trussell | July 13, 1943 |
| 2,505,694 | Stuercke | Apr. 25, 1950 |